Nov. 29, 1966 — H. L. McCORMICK — 3,287,906
COOLED GAS TURBINE VANES
Filed July 20, 1965 — 2 Sheets-Sheet 1
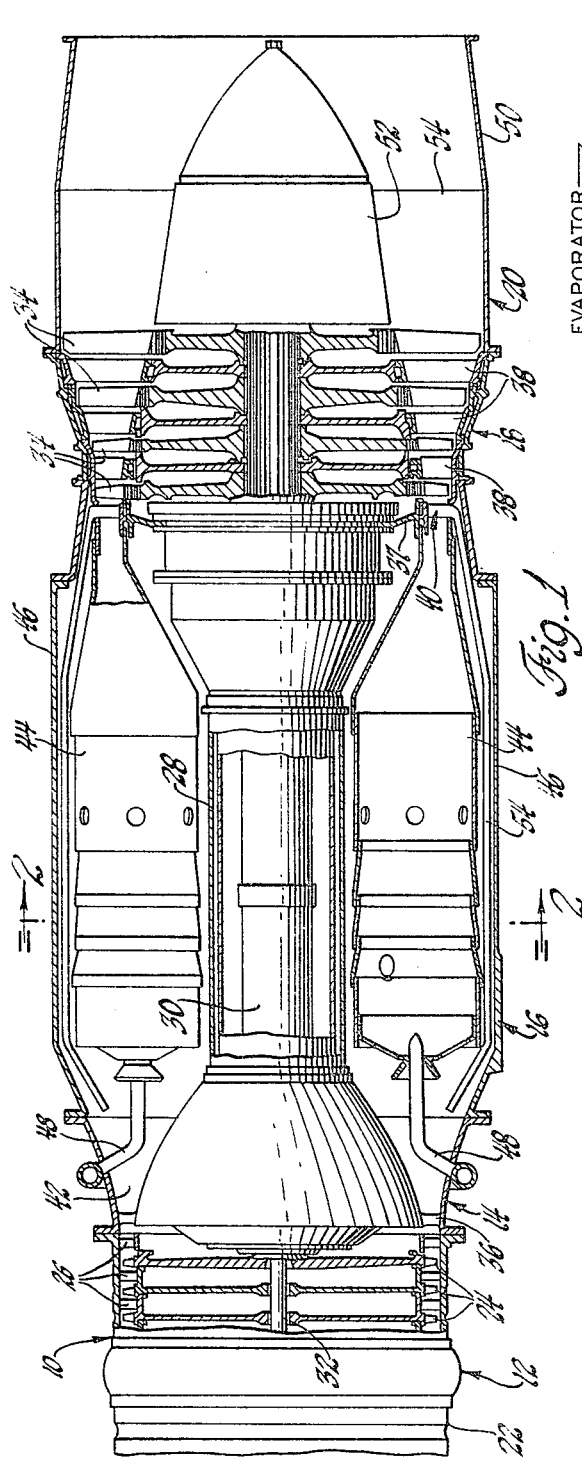
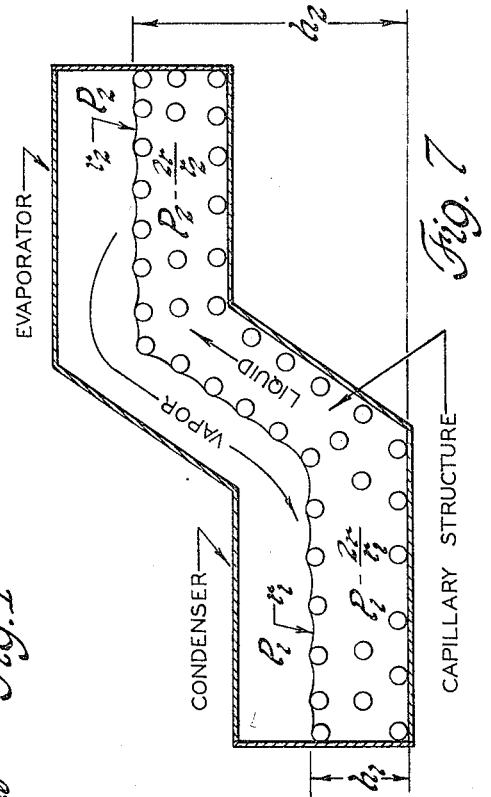
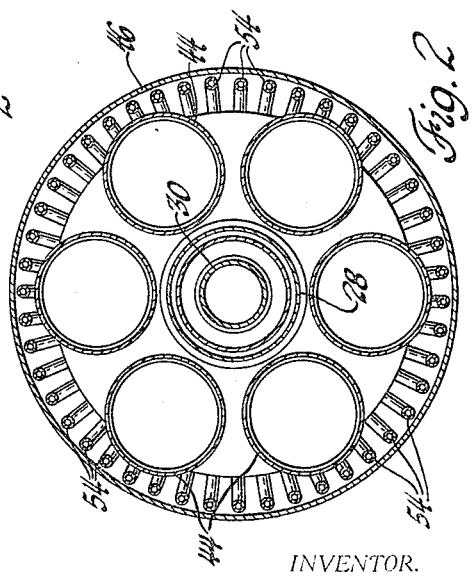
INVENTOR.
Hamilton L. McCormick, deceased
Signe M. McCormick, executrix
BY
Paul Fitzpatrick
ATTORNEY Nov. 29, 1966  H. L. McCORMICK  3,287,906
COOLED GAS TURBINE VANES Filed July 20, 1965  2 Sheets-Sheet 2

INVENTOR.
Hamilton L. McCormick, deceased
Signe M. McCormick, executrix
BY
Paul Fitzpatrick
ATTORNEY United States Patent Office 3,287,906
Patented Nov. 29, 1966

3,287,906
COOLED GAS TURBINE VANES
Hamilton L. McCormick, deceased, late of Carmel, Ind., by Signe M. McCormick, executrix, Carmel, Ind., assignor to General Motors Corporation, Detroit, Mich., a corporation of Delaware
Filed July 20, 1965, Ser. No. 473,529
7 Claims. (Cl. 60—39.51)

This invention relates to guide vanes for a turbine and the like. More specifically, this invention relates to an inlet guide vane ring for a turbine having a closed heat transfer circuit extending from the guide vanes to the compressor discharge area of the gas turbine to cool the vanes in the vane ring.

In present day gas turbine designs, the temperature level at which the turbine section is capable of operating is a limiting factor determining the power rating of the engine. Therefore, one of the easiest ways to increase the power output of a given gas turbine is to increase the operating temperature of the turbine section. Since the inlet guide vanes of the gas turbine are adjacent the downstream end of the combustion section and are, therefore, subjected to the highest temperatures in the turbine section, they become a critical point when the turbine section operating temperature is raised. With the metallurgical temperature limitations placed on today's designs, it becomes feasible to increase the turbine operating temperature only by providing some means of cooling the inlet guide vanes to maintain their temperature within these limits.

Previous cooling systems for the guide vane have included open circuits where compressor discharge air is bled off, flowed through the vanes for cooling and then dumped into the exhaust gas stream. Closed circuits wherein a heat transfer medium is evaporated in the turbine inlet guide vanes and carried upstream where the heat transfer medium is condensed transferring heat to the compressor inlet air has also been used. In the closed system, it is normally necessary to provide pumps in order to circulate the heat transfer medium and usually control, pressure relief valves, and a pump bypass circuit also accompanying the pump and the resulting system becomes highly complicated and unduly burdensome. This invention is directed toward providing a cooling system for the turbine guide vane ring which is of the closed circuit type but yet the system is not highly complicated and unduly burdensome. This system is also designed to transfer the heat to compressor discharge air so as to yield a twofold benefit. First, the vanes are cooled efficiently. Secondly the heat is transferred so as to give a regenerative effect to the compressor discharge air.

It is an object of this invention to provide a guide vane ring having a closed circuit cooling system which is simple, uncomplicated and comprises a minimum of parts.

Another object of this invention is to provide a guide vane ring having a closed circuit cooling system which does not require a pump, valves or other moving parts to circulate the heat transfer medium.

Another object is to provide a guide vane ring having a closed circuit cooling system which cools the vanes efficiently without degrading the engine's performance.

Other objects and advantages of the invention will hereinafter become more fully apparent from the following description of the annexed drawings, which illustrate a preferred embodiment, and wherein:

FIGURE 1 is a longitudinal section of a gas turbine engine which includes a closed circuit cooling system for the turbine inlet guide vane ring in accordance with this invention.

FIGURE 2 is a cross section taken along the line 2—2 of FIGURE 1 and looking in the direction of the arrows.

FIGURE 7 is a schematic showing the principle of operation of the closed heat transfer circuit used to cool an inlet guide vane such as the one shown in FIGURE 3.

Figure 3:
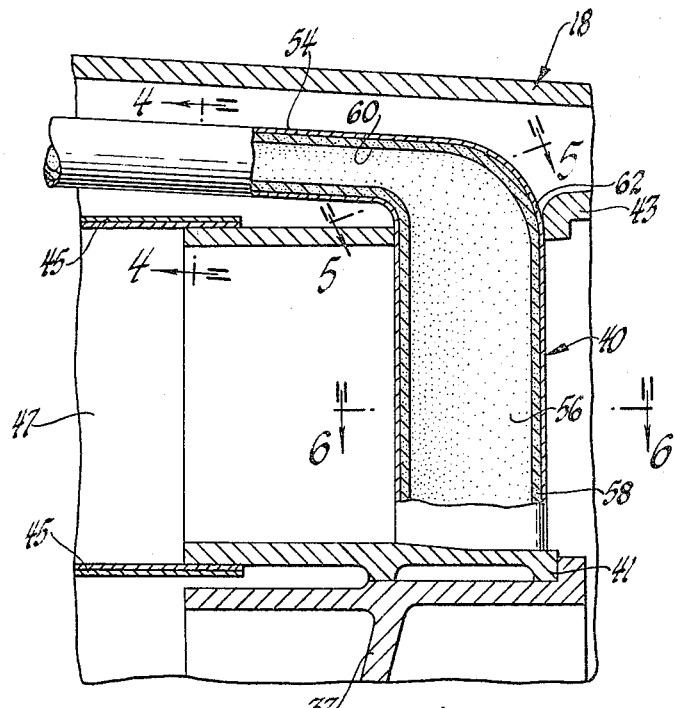
FIGURE 3 is an enlarged view of a portion of FIGURE 1 showing a single guide vane in detail.

Referring now to FIGURE 1, there is shown a gas turbine engine indicated generally at 10. The gas turbine engine 10 comprises a compressor section 12, diffuser section 14, combustor section 16, turbine section 18, and exhaust section 20. More specifically, the compressor section 12 comprises a cylindrical housing 22 having a plurality of axial compressor stages 24 rotatably mounted therein with guide vane rings 26 mounted between the rotor stages 24. A cylindrical housing 28 extends from the compressor section 12 to the turbine section 18 and houses shaft 30 which is connected to turbine wheels 34 at its downstream end. Struts 36 support the forward end of housing 28 while the rear end is supported by an annular wall 37. The annular wall 37 in turn is strut supported (not shown). The compressor rotors 24 are rim connected and secured axially by a tie bolt 32 to form a drum type rotor with the downstream rotor being connected to shaft 30 to receive torque from the turbine wheels 34. The forward end of the compressor rotor drives a gear box (not shown). Guide vane rings 38 are provided between the turbine rotor 34 and at the inlet of the turbine section 18. The exhaust section 20 is seen to merely comprise an outer circular circuit casing 50 with a tailcone 52 mounted centrally within it to form an exhaust passage 54.

Returning to the diffuser section 14, the forward end of the housing 28 is bell-shaped and forms a diverging annular passage or diffuser 42 with the housing of the compressor section 14. The combustion section 16 is shown as having six circumferentially spaced combustion cans 44 disposed radially between the housing 28 and the outer casing 46 of the combustion section 16. Fuel nozzles 48 mounted in the diffuser casing extend into the forward ends of the combustion cans 44.

Focusing our attention now on the turbine section 18 and the inlet guide ring in particular, it is seen to include a number of vanes 40. Tubes 54 extend from the outer ends of the inlet guide vanes 40 upstream through the combustor section 16. Radially the tubes 54 are located between the combustor cans 44 and the casing 46. The tubes 54 are closed at their upstream ends which terminate adjacent the compressor section 12 where they are exposed to cool compressor discharge air. The flow of the compressor discharge air over the end of the tubes 54 before it enters the combustor cans 44 is indicated in FIGURE 1 by arrows. As shown in FIGURE 2, there are 46 tubes 54, one being provided for each vane 40 in the inlet guide vane ring.

Figure 4:
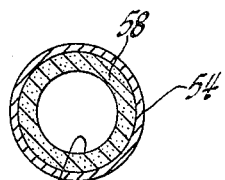
FIGURE 4 is a cross section taken along the line 4—4 of FIGURE 3 and looking in the direction of the arrows.
Figure 5:
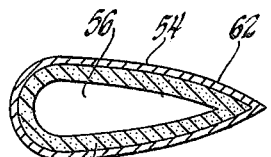
FIGURE 5 is a cross section taken along the line 5—5 of FIGURE 3 and looking in the direction of the arrows.
Figure 6:
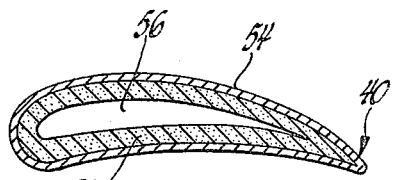
FIGURE 6 is a cross section taken along the line 6—6 of FIGURE 3 and looking in the direction of the arrows.

Referring now to FIGURE 3, a single inlet guide vane 40 is shown in detail. As is evident from the cross section, the vane 40 extends between inner and outer shrouds 41 and 43, respectively. The shrouds 41 and 43 are contiguous with the walls 45 which define the turbine inlet passage 47. The guide vane 40 is hollow providing an inner chamber 56. The chamber 56 is in communication with the bore 60 of the closed tube 54. A porous structure 58 is disposed in the chamber 56 adjacent the inner walls of the guide vane 40. The porous structure 58 continues through the transition portion 62 between the vane 40 and the tube 54 and into the tube 54. The cross sectional area of the tube 54 matches that of the vane 40. Likewise the cross sectional area through the transition portion 62 is kept constant to match that of the tube 54 and the vane 40. The cross sectional area of the porous structure 58 is also kept constant through the vane 40, transition portion 62, and the tube 54. FIGURES 4, 5, and 6 show the cross section of the vane 40, the tube 54, and the transition area 62, respectively.

The porous structure 58 is continuous from the forward end of the tube 54 to the inner end of the vane 40 and is of a controlled porosity, that is, the diameter of the pores in the porous structure increase from the vane end of the forward tube end. This controlled porosity is shown schematically in FIGURE 7 with which the principle of operation of the closed heat transfer circuit will be explained.

Referring now to FIGURE 7, there is shown an ordinary closed elongated cylindrical chamber of constant cross section which corresponds to tube 54, transition 62, and vane 40 of FIGURE 1. The chamber contains a porous capillary structure which extends its entire length and corresponds to the porous structure 58. The porous structure is of a controlled porosity, that is, the diameter of the pores decrease from the left end to the right end. In making the chamber, it is first filled with a liquid heat transfer medium such as sodium until the porous structure is slightly over saturated. The chamber is then evacuated and sealed so that only the heat transfer medium is present within the tube and at a subatmospheric pressure. The heat transfer medium thus is in both the liquid state and the vapor state; the porous structure being substantially saturated with liquid sodium while the remainder of the chamber is filled with sodium in the vapor state. When the right end of the cylinder is placed in a hot environment such as the vanes 40 in the turbine inlet and the left end is placed in a relatively cool environment such as the end of tube 54 in an area subjected to compressor discharge air, the following phenomena will take place. While the compressor discharge air may be on the order of 500–600° F., it is relatively cool compared to turbine vane temperatures on the order of 1700–1800° F. The vapor in the right end will be at a pressure $P_2$ which is higher than the pressure $P_1$ of the vapor at the left end because the vapor in the right end is at a higher temperature. Also as shown, the right end is at a higher potential energy level $h_2$. The result is that the vapor flows from right to left or from the evaporator to the condenser. While as illustrated the vapor flow will be aided by the difference in potential energy, it is to be understood that this difference is not required. The tube may be at one equal level or the vapor may be required to flow uphill, that is, $h_1 \geq h_2$. In the turbine application, this corresponds to vapor flow from the vanes 40 to the upstream end of the tubes 54. At the left end, the vapor is condensed into the capillary porous structure as a liquid. The pressure of the liquid at the left end, however, is somewhat lower than that of the vapor. The pressure drop through the meniscus having a radius $r_1$ equal to or greater than the capillary pore size at that point is $2\gamma/r_1$ where $\gamma$ is the surface tension. Correspondingly, the pressure in the liquid at the right end is $$P_2 - \frac{2\gamma}{r_2}$$

A positive pressure drop to drive the liquid from the condenser to the evaporator may be created by controlling the porosity of the capillary structure. That is, $$P_1 - \frac{2\gamma}{r_1} + \rho g h_1$$

(where $\rho$ is the liquid density and $g$ is the acceleration due to gravity) must be greater than $$P_2 - \frac{2\gamma}{r_1} + \rho g h_2$$

even though both $P_2$ and $h_2$ are greater than $P_1$ and $h_1$. Expressed mathematically:

$$\frac{r_1 - r_2}{r_1 r_2} \frac{(P_2 - P_1) + \rho g (h_2 - h_1)}{2\gamma}$$

This can obviously be done from the above equation by making $r_1$ or the pore diameters at the left or condenser end larger than the pores at the evaporator end. While we have considered only the end points, the same relationship holds for the intermediate points resulting in the requirement of a progressively increasing pore diameter from the evaporator to the condenser end. When this is done, the porous capillary structure will flow the liquid from the condenser end to the evaporator end even though the pressure in the vapor at parallel points causes the vapor to flow in the opposite direction and even though the liquid must flow uphill. When the liquid reaches the right end corresponding to the vane 40 of FIGURE 1, heat is absorbed from the vane walls evaporating the liquid inside and cooling the vane. The vapor thus driven out of the porous structure is at pressure $P_2$ and will flow to the left or condenser end to repeat the heat transfer cycle. Thus the circulating heat transfer media cools the vanes 40 efficiently and transfers the heat to the compressor discharge air. This is a regenerative effect and as such is beneficial to the engine since adding heat to the compressed air at this point less the requirement for heat addition by combustion. Fuel may be saved and the engine specific fuel consumption consequently lowered.

Thus it can be seen that this invention provides a guide vane ring provided with a closed circuit cooling system which provides a two-fold benefit. First its primary purpose, that is, cooling of the vanes is fulfilled by a system which is simple and requires no pump or other moving parts. Secondly, it fulfills this purpose in a manner which is beneficial to the engine, that is, gives a regenerative effect to improve the engine fuel consumption.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. In a gas turbine having compression, combustion, and turbine zones in serial relationship, the combination comprising:
    guide vane means in said turbine zone exposed to hot combustion gases flowing through said turbine zone,
    a plurality of circumferentially spaced closed tubes extending axially from said guide vane means to an area subjected to compressor discharge air,
    wick means disposed in said tubes and said guide vane means, and
    a heat exchange medium substantially filling said tube and said guide vane means, a portion of said heat exchange medium being in the liquid state and saturating said wick means with the remainder being in a vapor state whereby a closed system is provided to transfer heat from said guide vane means to said compressor discharge air to cool said guide vane means.

2. In a gas turbine having compression, combustion, and turbine zones in serial relationship, the combination comprising:
    guide vane means in said turbine zone exposed to hot combustion gases flowing through said turbine zone,
    a plurality of circumferentially spaced closed tubes extending axially from said guide vane means to said compression zone,
    porous means disposed in said tubes and said guide vane means, said porous means extending continuously and having pores of progressively increasing diameter from said guide vane means to the upstream end of said tube, a heat exchange medium substantially filling said tube and said guide vane means, a portion of said heat exchange medium being in the liquid state and saturating said porous means with the remainder being in a vapor state whereby a closed system is provided to transfer heat from said guide vane means to said compressor discharge air to cool said guide vane means.

3. In a gas turbine having compression, combustion, and turbine zones in serial relationship, the combination comprising:

a guide vane ring in said turbine zone exposed to hot combustion gases flowing through said turbine zone, said guide vane ring having a plurality of guide vanes each with an internal chamber, a tube extending from said chamber to an area subjected to compressor discharge air, said tubes being closed at the end remote from said chamber, an annular porous structure disposed in said tubes and said chamber abutting the inner walls thereof, said porous structure having pores of progressively increasing diameter from said chamber end to said remote end, and a heat exchange medium substantially filling said tubes and said chambers, a portion of said heat exchange medium being in the liquid state and saturating said porous structure with the remainder being in a vapor state whereby a closed system is provided to transfer heat from said guide vanes to said compressor discharge air to cool said guide vane ring.

4. The combination as defined in claim 3 wherein the tubes and the vanes are substantially equal in cross-sectional area and wherein the annular porous structure is of substantially constant cross-sectional area.

5. The combination as defined in claim 3 wherein the tubes and chambers are sealed and evacuated whereby the heat transfer medium is at a subatmospheric pressure.

6. The combination as defined in claim 4 wherein the tubes and chambers are sealed and evacuated whereby the heat transfer medium is at a subatmopsheric pressure.

7. The combination as defined in claim 6 wherein the heat exchange medium is sodium.

References Cited by the Examiner
UNITED STATES PATENTS

| | | | |
|---|---|---|---|
| 2,650,060 | 8/1953 | Stalker | 253—39.15 |
| 3,015,937 | 1/1962 | Giliberty | 60—39.51 X |

MARK NEWMAN, *Primary Examiner.*

R. D. BLAKESLEE, *Assistant Examiner.*